(12) United States Patent
Gaudette et al.

(10) Patent No.: US 6,867,782 B2
(45) Date of Patent: Mar. 15, 2005

(54) CACHING DATA IN A PROCESSING PIPELINE

(75) Inventors: Michel Gaudette, Montreal (CA); Stephane Trinh, Montreal (CA)

(73) Assignee: Autodesk Canada Inc., Montreal (CA)

( * ) Notice: Subject to any disclaimer, the term of this patent is extended or adjusted under 35 U.S.C. 154(b) by 384 days.

(21) Appl. No.: 09/772,500

(22) Filed: Jan. 29, 2001

(65) Prior Publication Data

US 2001/0029505 A1 Oct. 11, 2001

(30) Foreign Application Priority Data

Mar. 30, 2000 (GB) .............................................. 0007571

(51) Int. Cl.⁷ ................................................. G06T 1/60

(52) U.S. Cl. ....................... 345/530; 345/522; 345/619; 348/302

(58) Field of Search ................................. 345/501, 530, 345/557, 522, 537, 619, 440, 763; 711/126, 140, 123; 348/302, 303, 305

(56) References Cited

U.S. PATENT DOCUMENTS

| 5,708,767 | A | * | 1/1998 | Yeo et al. |
| 5,956,744 | A | * | 9/1999 | Robertson et al. |
| 5,970,496 | A | * | 10/1999 | Katzenberger |
| 6,266,053 | B1 | * | 7/2001 | French et al. |

* cited by examiner

*Primary Examiner*—Ulka J. Chauhan
*Assistant Examiner*—Hau Nguyen
(74) *Attorney, Agent, or Firm*—Gates & Cooper LLP

(57) ABSTRACT

An image processing system processes image data in response to a sequence of image processing steps defined by a process tree data structure. The process tree comprises a plurality of interconnected nodes, including input nodes and at least one output node. Output rendering is performed a frame at a time, and each frame is rendered in a time determined by the amount of processing defined by the process tree. The process tree may comprise many branches of interconnected nodes, and the user can selectively cache intermediately rendered frames at nodes where the contributing process tree branches are relatively stable in their configuration. The user may then make modifications to processes in other parts of the process tree, without having to wait for image data to be rendered from unchanged parts of the process tree.

24 Claims, 15 Drawing Sheets

US 6,867,782 B2

CACHING DATA IN A PROCESSING PIPELINE

BACKGROUND OF THE INVENTION

1. Field of the Invention

The present invention relates to processing image data in response to a data structure defining image processing, and in particular relates to processing large quantities of image data in response to a data structure.

2. Description of the Related Art

Systems for the processing of image data are known in which large quantities of digitised film or video data are processed in order to provide special effects. The image data consists of multiple image frames, and an output clip is generated by sequentially processing input frames from an input clip. Also, it is known to combine images from several image clips simultaneously, whereby one or several foreground clips are placed against a common background. This is a process known as compositing.

Historically, compositing, effects and other forms of image processing were often performed in several stages. A complex scene derived from multiple input clips would require intermediate clips to be generated. This results in the need for costly storage of the intermediate clips, and also creates considerable complexity in the administration of the various stages of processing. A major problem with this approach is that complex effects requiring intermediate clips are too expensive to permit creative experimentation.

This difficulty, in the context of digital image processing, has been solved by defining complex sequences of compositing, effects, and other types of image processing in a data structure called a process tree. A process tree typically has one or several inputs, and one or more outputs. intermediate processing nodes, and their interconnections, define process combinations of arbitrary complexity. The output clip is generated a frame at a time, with each frame being calculated according to the operation of process nodes and their interconnections in the process tree.

Whereas previously it would have been necessary to generate output clips in their entirety, a process taking possibly several hours or days, the process tree generates a single frame at a time, taking from less than a second to several minutes, depending on the complexity of effects defined by the process tree. The operator of such a system, often referred to as a digital artist, can tune or retouch the data structure used to create a scene or effect without having to render each intermediate clip of the tree. Once satisfied with the results, the entire output clip can be rendered to disk for eventual transfer to film or another medium.

The popularity of this approach, and the capabilities offered by such a system, have resulted in process trees of considerable complexity being used routinely. This results in an overall increase in the rendering time for each frame. This increase in processing time is tolerated, because the results from this arrangement are usually worth the wait. Alternatively, a faster computer can be used to reduce the time to render each frame. However, the amount of processing required for a complex processing tree is considerable, and limitations in computer architecture, as well as cost, provide a limit to the effectiveness of a brute force solution.

BRIEF SUMMARY OF THE INVENTION

According to an aspect of the present invention, there is provided apparatus for processing image data, comprising image data storage means, memory means for storing instructions and a data structure representing processing to be performed on source image data in said image storage means, processing means for performing said image processing, and wherein said instructions define a sequence of operations to be performed in order to process said source image data in accordance with said data structure, in which said data structure includes a plurality of image processing nodes, said processing nodes are connected to each other to define a processing pipeline for image data, and said instructions are executed by said processing means to perform the steps of processing image data in response to said data structure, storing image data associated with an intermediate node in said data structure in response to an identification of node cache preference, and thereafter processing image data in response to parts of said data structure not affecting image data that has been cached by said intermediate node.

BEST MODE FOR CARRYING OUT THE INVENTION

Figure 1:
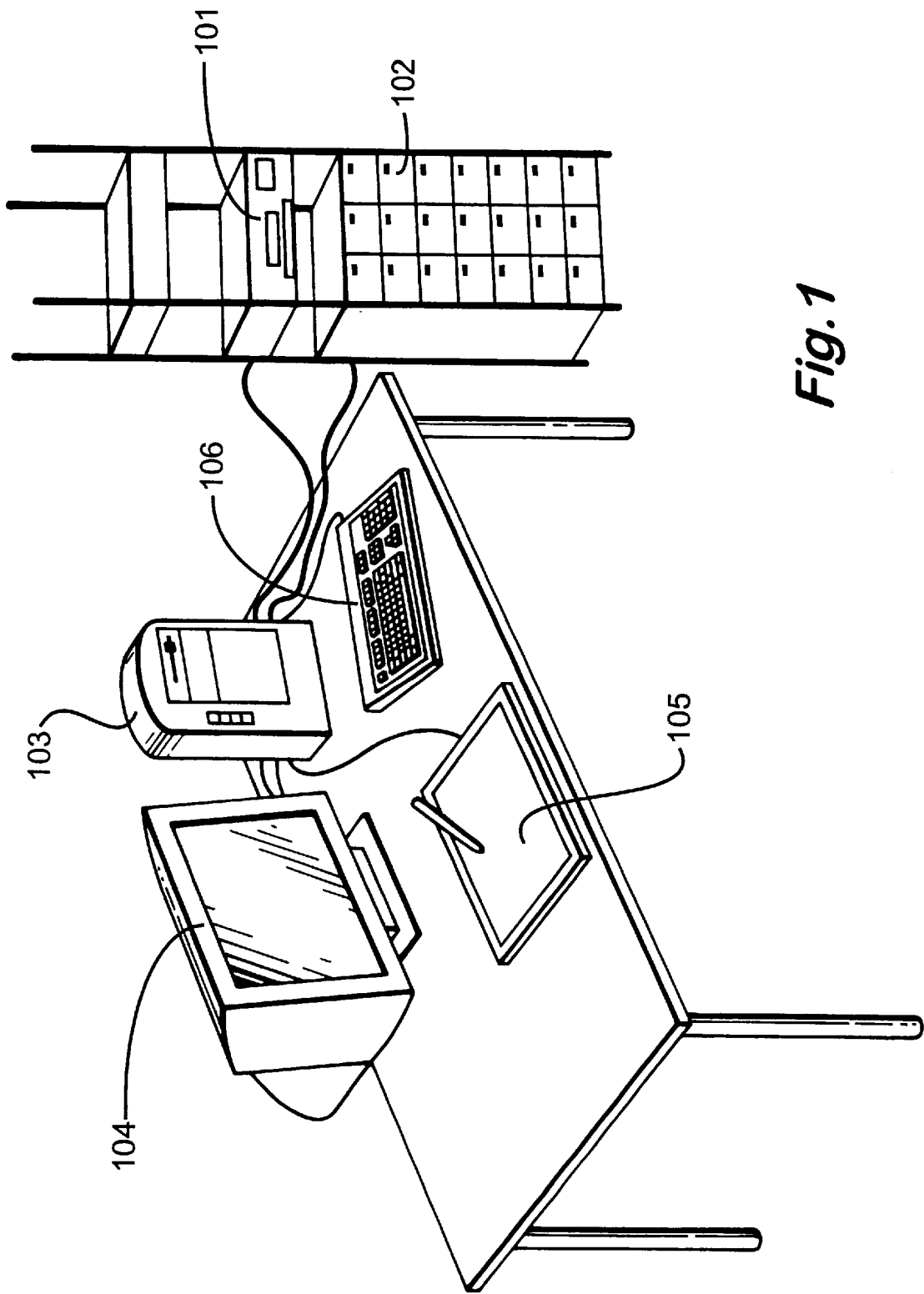
FIG. 1 shows an image processing system, including a frame store, a computer and a monitor.

A system for the processing of image data is illustrated in FIG. 1. A digital tape player 101 plays and records digital tapes having a high data capacity suitable for storing many frames of high definition image data. In preparation for image processing, images for a film clip are transferred from a tape in the tape player 101 to a frame store 102. The frame store 102 comprises several high capacity hard disk drives, arranged to supply and store image data in parallel across many individual drives at once. The hard disk drives are configured as a redundant array of inexpensive disks (RAID). Using the frame store 102, it is possible to play back and record high resolution film images at any location in a clip without having to wait for a tape wind mechanism to reach the required frame. Furthermore the frame store facilitates real time play and record of image data, when the amount of processing being performed is minimal, for example when previewing a stored clip.

A computer 103 facilitates the transfer of image data between the tape player 101 and the frame store 102. The computer 103 also facilitates the modification, processing and adjustment of image data to form an output clip that will eventually be stored onto digital tape. The computer is a Silicon Graphics Octane (TM). Images are previewed on a monitor 104 on which is also displayed a graphical user interface (GUI) to provide the user with several controls and interfaces for controlling the manipulation of image data. When processing image data, the user interacts with images and the graphical user interface displayed on the monitor 104 via a graphics tablet 105. For alphanumeric input, there is provided a keyboard 106, although facilities may be provided via the graphical user interface to facilitate occasional text input using the graphics tablet 105.

In addition to receiving image data from the tape player 101 and the frame store 102, the computer 103 may receive image and or other data over a network. The image processing system shown in FIG. 1 facilitates the manipulation of image data by a digital artist in order to achieve high quality special effects and processing of image data.

In a typical application, film clips are digitised and stored on digital tape for transfer to the system in FIG. 1. The film clips include several camera shots that are to be combined into the same scene. It is the task of the user or digital artist to combine and process this source image data into a single output clip that will be stored back onto tape for later transfer to film. Typical examples of this type of scene are where real images shot by a film camera are to be combined with artificially generated images and backgrounds, including scenes where actors are to be placed in computer-generated environments.

Figure 2:
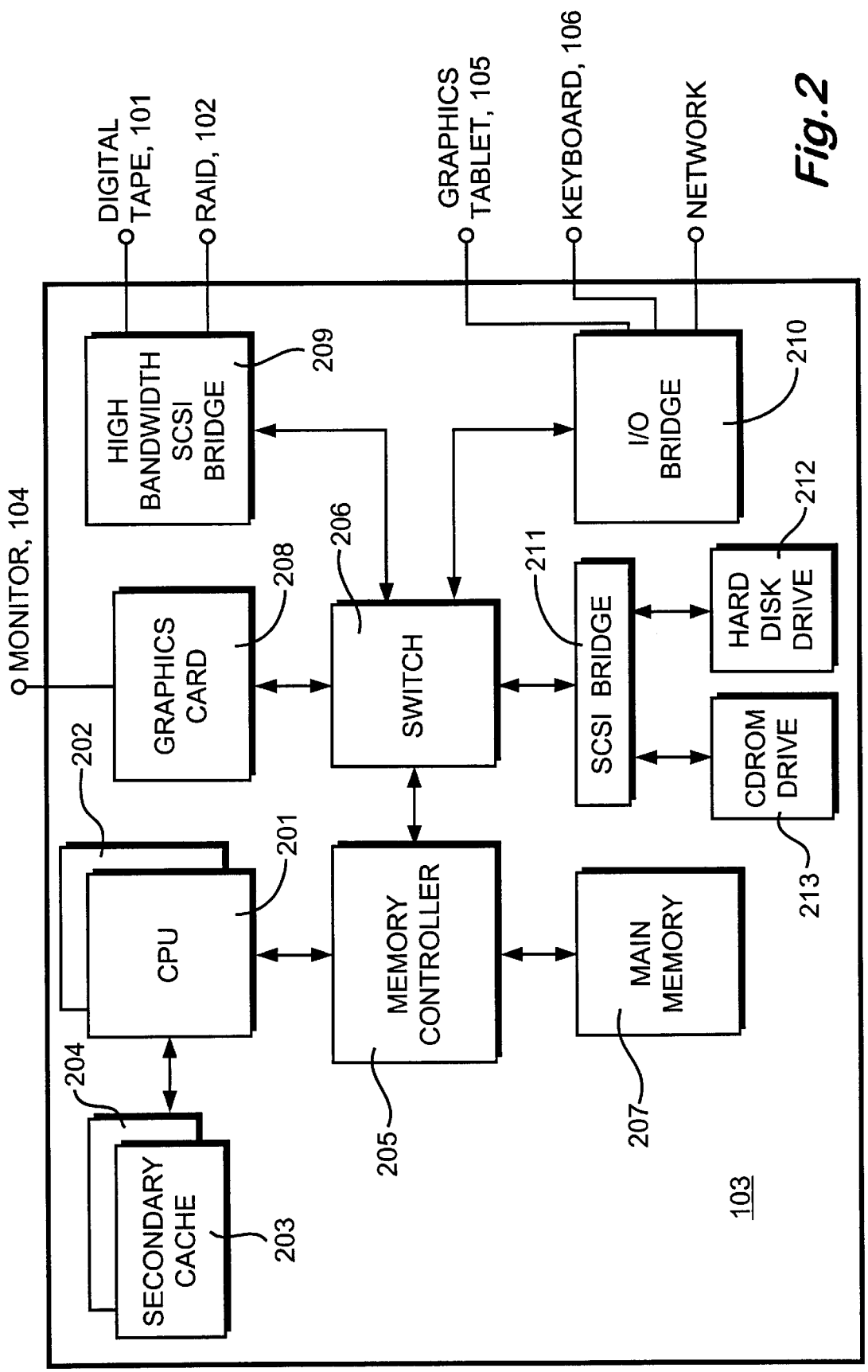
FIG. 2 details hardware components of the computer shown in FIG. 1, including a main memory and a hard disk drive.

The computer 103 shown in FIG. 1 is detailed in FIG. 2. Two MIPS R12000 central processing units (CPUs) 201 and 202 are configured to process instructions and data in parallel. Primary cache facilities are provided within each of the processors 201 and 202 in the form of a separate instruction and data cache. Both processors 201 and 202 are equipped with a one megabyte secondary cache 203 and 204. The CPUs 201 and 202 are connected via a memory controller to a switch 206 and a main memory 207. The main memory 207 comprises two gigabytes of dynamic RAM.

The switch 206 enables up to seven different non-blocking connections to be made between connected circuits. A graphics card 208 receives instructions from a CPU 201 or 202 in order to render image data and graphical user interface components on the monitor 104. A high bandwidth SCSI bridge 209 facilitates high bandwidth communications to be made with the digital tape player 101 and the frame store 102. An I/O bridge 210 provides input output interface circuitry for peripherals, including the graphics tablet 105, the keyboard 106 and a network. A second SCSI bridge 211 provides interface connections with an internal hard disk drive 212. This has a capacity of thirteen gigabytes. The second SCSI bridge 211 also provides connections to a CDROM drive 213, from which instructions for the central processing units 201 and 202 may be installed onto the hard disk 212.

Instructions for central processing units 201 and 202 determine how image data is processed. Several applications have been developed for image processing using processing hardware of the type shown in FIG. 2. The present applicant has image processing applications that include Batch (TM) and Flame (TM). The name Batch will henceforward refer to an improved version of Batch, operating in accordance with the present invention.

Figure 3:
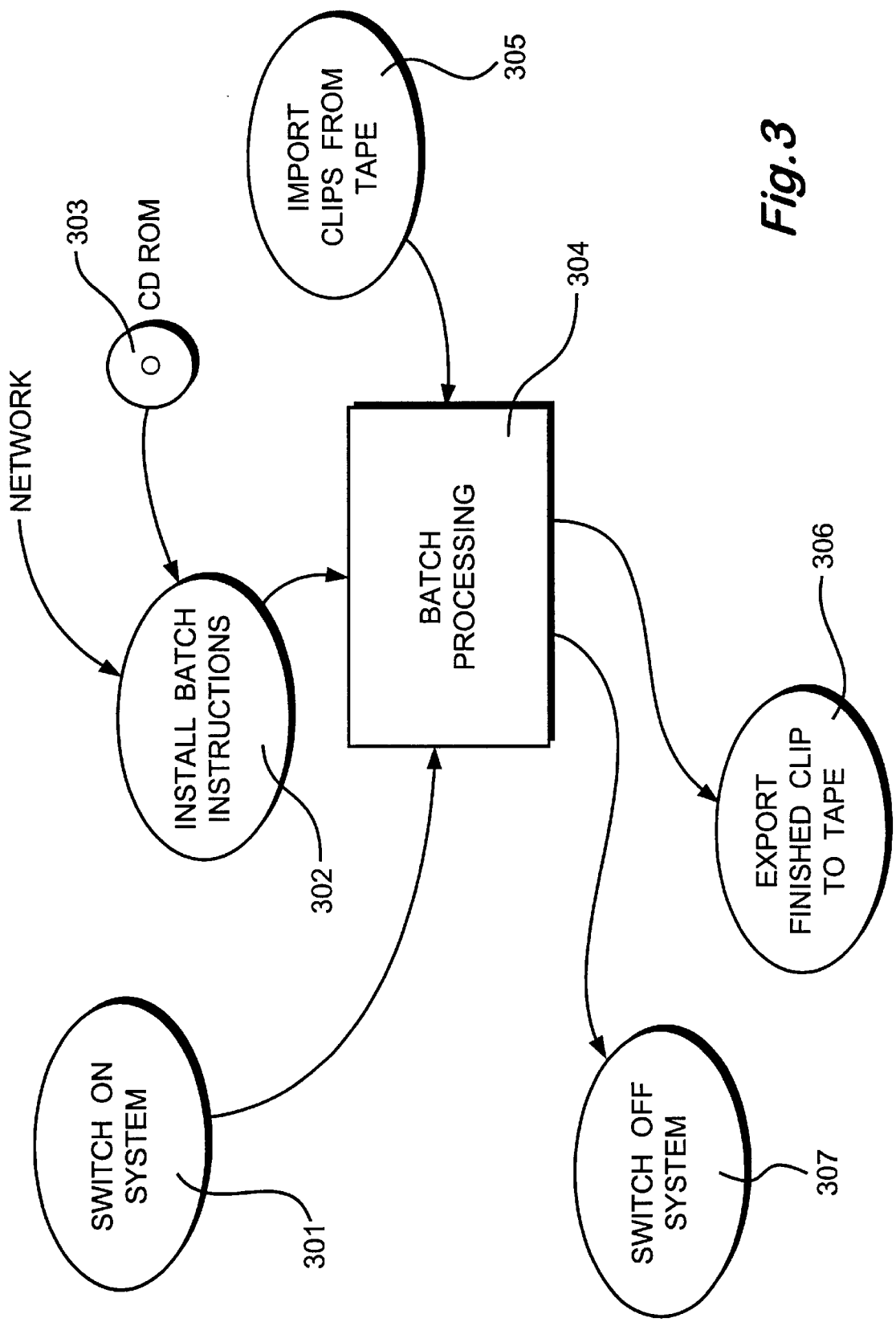
FIG. 3 details steps performed by the user of the system shown in FIG. 1, including a step of processing image data.

Steps performed by the user when operating the image processing system shown in FIG. 1 are detailed in FIG. 3. At step 301 the user switches on the computer 103 and logs on to their user account. If necessary, the user proceeds to step 302 in order to install Batch instructions onto the computer's hard disk 212. Instructions may be provided on a CDROM 303 via the CDROM drive 213, or over a network. Thereafter, control is directed to step 304, whereafter the instructions are executed by the CPUs 201 and 202. If starting on a new job, it will be necessary to obtain image data from film or video clips stored on digital tapes. This is done at step 305, where input clips are transferred from the tape player 101 to the digital frame store 102. Once a finished clip has been generated from the input clips, this is exported to tape at step 306. Alternative forms of import and export of image data may be performed as necessary, including transfer of image data over a network, transfer of image data from CDROM or transfer of data directly from a camera that may be connected to the input of a suitably equipped graphics card 208. Once finished using the image processing system, at step 307 the user logs off from their account and the computer and other equipment are switched off if necessary.

When compositing a complex scene, the steps shown in FIG. 3 may be performed over a period of several days or weeks in order to produce a single output clip. On the first day, the user will import film material digitally, possibly from a variety of sources, and begin processing this image data. However, many days may pass before the finished clip is produced, and only at this time is the resulting clip transferred back to digital tape, for eventual transfer back to film. It is preferable to perform as much processing and decision making as possible at step 304, without the need to preview the results on film, as transfers to and from film are highly expensive and time consuming. It is preferable, therefore, to provide facilities at step 304 such that as much image processing is performed as possible, and the finished clip generated at step 306 can be included in the final film without further modifications being necessary.

Figure 4:
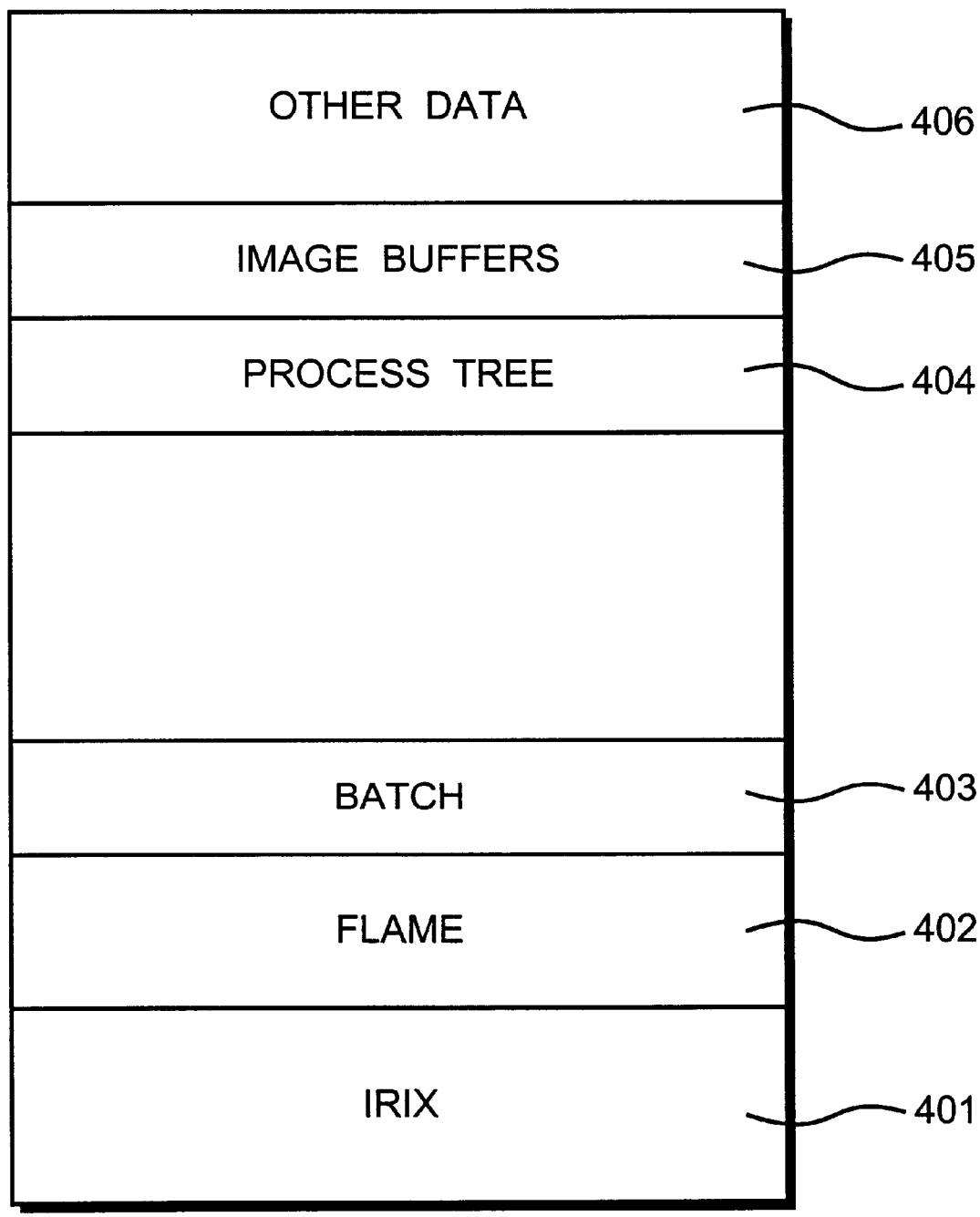
FIG. 4 details contents of the main memory shown in FIG. 2, including a process tree.

During Batch processing at step 304, the contents of the computer's main memory 207 shown in FIG. 2 are as shown in FIG. 4. Common instructions for several simultaneously executing processes are provided in the form of an operating system 401. The operating system is the Irix (TM) operating system supplied by Silicon Graphics for use on the Silicon Graphics Octane computer 103. Flame instructions 402 include high quality image processing modules, each of which includes instructions for processing image data in a particular way. These instructions may be used in an instruction environment generated by another module in the Flame application, or alternatively the modules may be used in an environment generated by the Batch application 403. Batch 403 processes image data in accordance with a process tree data structure 404. Image buffers 405 are required for intermediate image data storage during image processing. Other data 406 includes areas of main memory 207 used by the operating system 401 and other applications.

A particular Flame 402 module that is used frequently in image processing is a color keyer module. In color keying, a first scene is shot by a film or other camera against a blue background. In the keying process, the background is identified by its color, and pixels of that color are replaced by pixels from a different image source. Color keying is used extensively in television and in digitally-processed film, in order to facilitate the creation of artificial environments. An example of this type of scene is the superposition of large numbers of actors from several different clips in a single artificially generated environment. In order to generate a scene of this kind, many color keyer modules are used for different parts of the image. Color keying is used in combination with other effects, in order to improve the quality and realism of the resulting clip. For example, it may be necessary to apply scaling and color correction to clips of real actors in order to ensure that they have an appropriate size and appearance in the finished scene.

Figure 5:
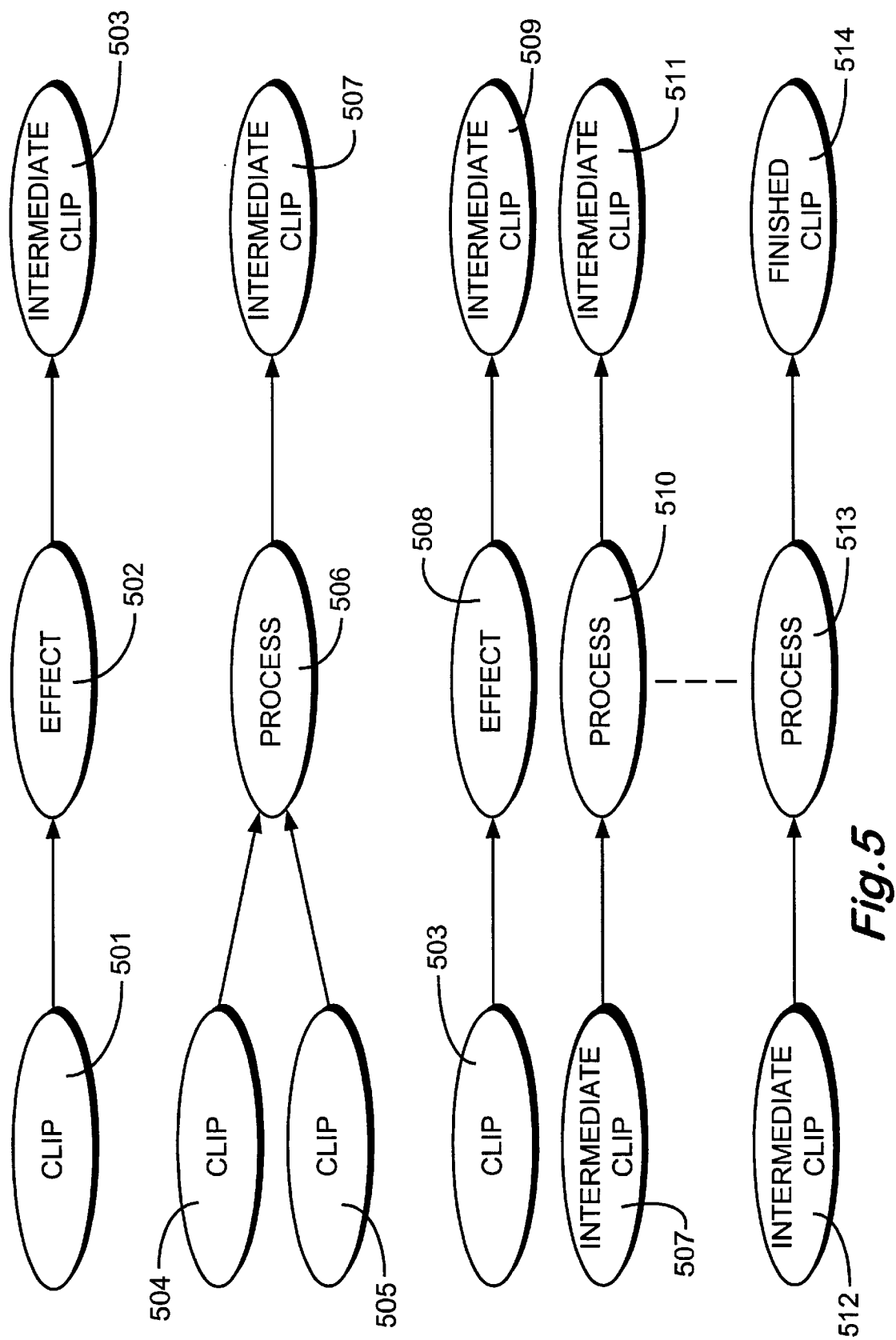
FIG. 5 details a known method of image processing in which intermediate clips are generated.

Historically, compositing a complex scene from multiple input clips has been performed in several stages. These are shown in FIG. 5. An input clip 501, originating from a film camera, is processed by an effect 502, such as scaling, to generate an intermediate clip 503. Input clips 504 and 505 may be combined by a process 506 such as a color keyer, to generate a second intermediate clip 507. The first intermediate clip 503 may then be processed by a different effect 508 to form a third intermediate clip 509. The second intermediate clip 507 is processed again 510 to form yet another intermediate clip 511. In this way many intermediate clips are generated. In a final stage, an intermediate clip 512, or possibly several intermediate clips, are processed 513 to form the finished clip 514.

Whether processed digitally or using some other method, the generation of intermediate clips after every stage results in considerable cost and time. It is also extremely limiting in a creative sense, because the artist responsible for the creation of the finished clip cannot see the results of early processing 502, 506, until long after this has been performed. This severely restricts the degree of experimentation that is possible.

When carried out digitally, the amount of storage required for intermediate clips 503, 507, 509, 511 can be prohibitive. A single digitised frame of film may require as much as forty megabytes of data storage in the frame store 102. At twenty-four frames per second, and with many intermediate clips being generated, storage quickly becomes a limiting factor, with it soon becoming necessary to transfer intermediate clips to tape and back again in order to facilitate the compositing of film clips of more than a few seconds in duration.

Figure 6:
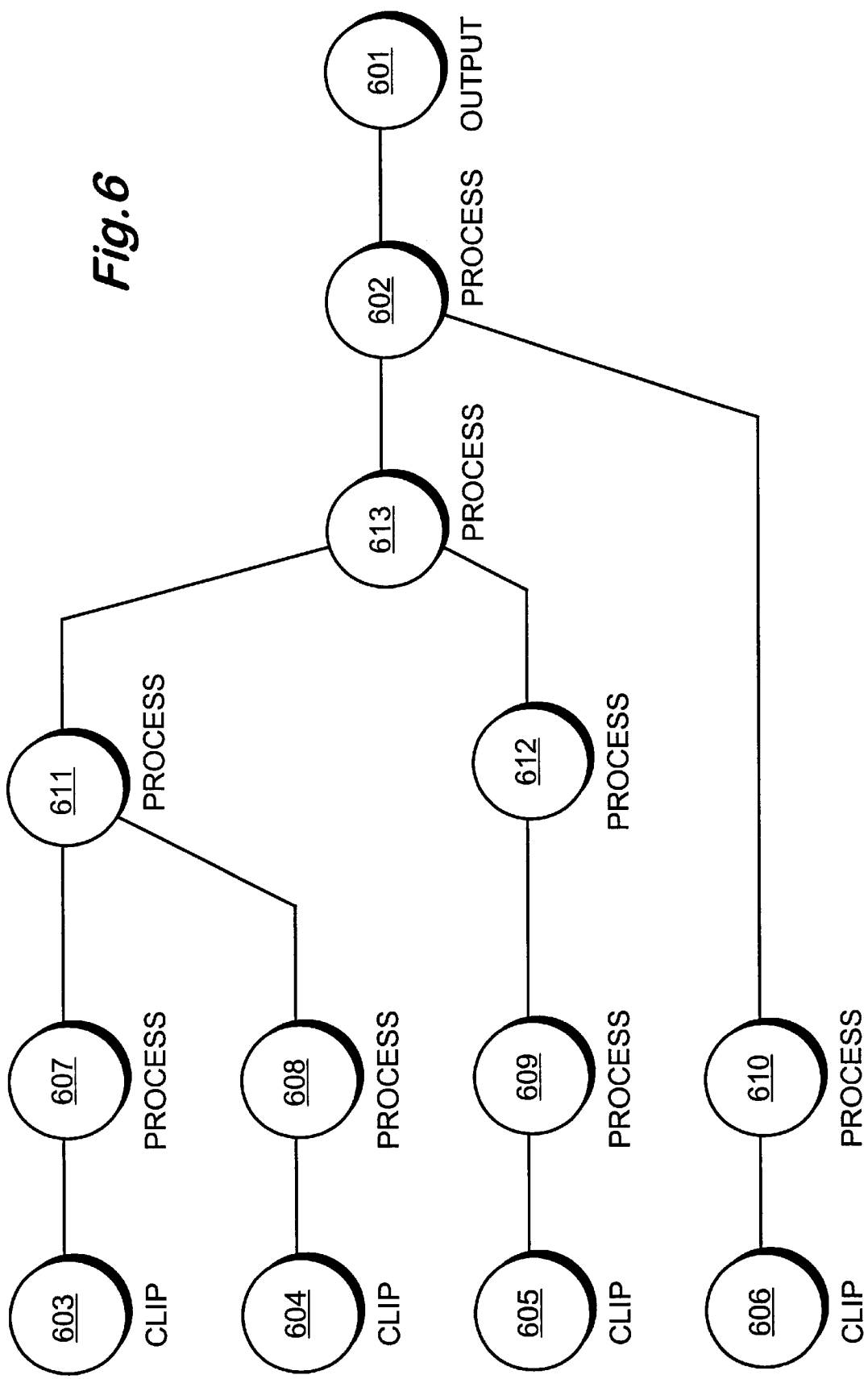
FIG. 6 details a data structure for controlling image processing in which intermediate clips are not generated.

Batch 403 provides a solution to this problem by processing intermediate image data 503, 507, 509, 511 on a frame-by-frame basis. The flow of image data from input clips to output clip is defined in a data structure called a process tree. A process tree exists as a data structure 404 in main memory 207, and can be represented graphically as shown by the example in FIG. 6. Each process or effect, input or output is shown in the tree as a node. Connections between the nodes define the flow of image data. Each node generates a single frame of image data which is stored in an output buffer for the node which is stored in a region 405 of main memory 207 set aside for this purpose. The output clip is generated a frame at a time at an output node 601.

When generating each new frame of the output clip, a requirement for a new frame is passed from the output node 601 to process node 602. This requires two new frames from different paths in order to update its output buffer. Each path is considered in turn, resulting in a request for new image data being transferred all the way to the input clip nodes 603, 604, 605 and 606. Thereafter, each process 607 to 613 is able to update its output buffer with valid image data, and so, eventually, the output buffer of the output node 601 becomes ready for display.

As processing is performed a frame at a time, intermediate storage 503, 507, 509, 511 is reduced from being the length of an entire clip to the size of a single frame. Intermediate frames may therefore be stored in the image buffers 405 in the main memory 207 of the computer 103. When main memory 207 is insufficient, virtual memory techniques may be used by Batch to logically increase the size of the main memory 207 using temporary storage on one of the connected hard disk drives.

The use of a process tree data structure 404 for processing image data facilitates complex combinations and modifications of input clips to be made while previewing the final results a frame at a time after only a relatively short time delay. The versatility of this system encourages creativity, and enables a digital artist to experiment and compose clips that are many hundreds of times more complex than could be reliably achieved with the method shown in FIG. 5. Scenes from the film Titanic (TM) used process trees having hundreds of interconnected process nodes.

Figure 7:
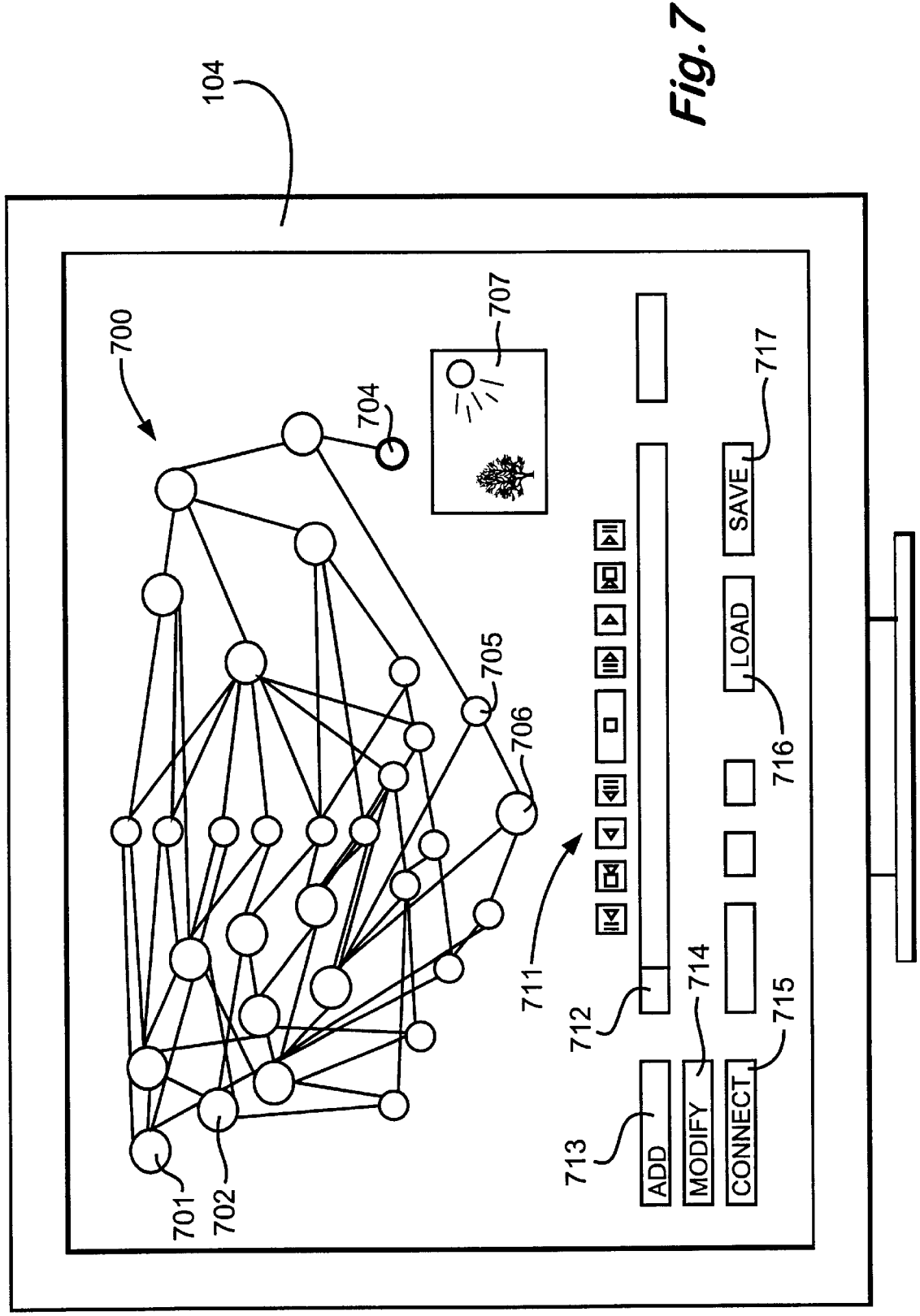
FIG. 7 shows a user interface displayed on the monitor shown in FIG. 1, including an interface to a data structure of the type shown in FIG. 6.

The interface presented on the monitor 104 when interacting with a process tree in Batch is shown in FIG. 7. The process tree 700 in this example is still many times simpler than those commonly used. A simplified example is shown for the purpose of clarity.

Input nodes 701 and 702 are processed in accordance with the process tree structure 404 to supply image data on a frame by frame basis to the output node 704. Many intermediate nodes 705 and 706 provide the effects and processes in the process tree. In the present embodiment, these effects and processes are supplied as modules of Flame instructions 402, but these may instead be supplied as modules of instructions from any source, provided they conform to the requirements of the Batch application interface (API) for effects and processing modules. Output image frames are displayed in an image window 707, which may be resized and moved as required. The image window may be enlarged to fill as much of the screen as required, in order to check the quality of results in more detail.

Other components of the user interface are transport controls 711, enabling the user to select frames for rendering, and to jump quickly to any part of the final clip. A timeline 712 provides a graphical indication of the percentage of elapsed time through the output clip that is being generated. An add button 713 facilitates the addition of new process nodes 705, 706. A modify button 714 facilitates the modification of node functionality. Node modification typically results in new menus being provided to interact with the node's internal process or algorithm in great detail. A process node such as a color keyer node 705 may itself contain comprehensive user interface components that enable the user to make complex adjustments to achieve high quality results. User modification of a node may itself take a substantial amount of time. A connect button 715 facilitates connection between process nodes in the process tree. The functionality of buttons 713, 714 and 715 may be duplicated or replaced by keypress combinations on the keyboard 106 and or other methods of interacting directly with the process tree using the graphics tablet 105. Interaction with the user interface components is mainly achieved by using the graphics tablet 105 to position a cursor over the required soft button on the display and pressing a real button on the stylus used with the graphics tablet.

A load button 716 and a save button 717 are provided to save and load the process tree data structure 404 to and from the hard disk 212. Other user interface buttons are provided that enable the user to zoom into and out of the process tree 700, move nodes to generate a more easily viewed visual layout, and to access other sections of the Batch or Flame instructions, such as those required to import or export clips via the digital tape player 101.

The interface and facilities illustrated in FIG. 7 enable a digital artist to quickly and efficiently build up a complex process tree 700. As a result of this complexity, the amount of processing required to generate each frame of an output clip is considerable.

With a complex process tree 700, the user will tend to work on one section of the tree at a time. For example, the user may choose to work on a background effect over the period of one day, and then spend the next several days configuring clips that appear in the foreground. Thus, many portions of the process tree are static in their configuration, and generate the same intermediate image data every time the same frame of the output clip is rendered. Other portions of the process tree change in response to user modifications, and so nodes affected by changes do not generate the same intermediate image data for a frame when that frame is rendered on subsequent previews of the output clip.

Nodes between the input 701 and output 704 nodes are considered intermediate nodes, and their output buffers contain intermediate image data. In the invention, intermediate image data in the output buffer of an intermediate node 705 is cached in response to user identification of a node cache requirement. Caching comprises first storing image data, and then, on subsequent demands for image data from a particular node, checking the node cache before performing node processing, and, if the cache contains valid data for a requested frame, reading that data from the cache instead of calculating it according to the functionality of the node. Given the complexity of some node algorithms, the saving in processing time for the process tree as a whole can be highly significant.

The user identifies a node cache requirement for a node whose output is likely to remain the same. Processing performed by CPUs 201 and 202 may thereafter be directed towards other nodes, whose configuration or interconnection is being adjusted by the user.

Figure 8:
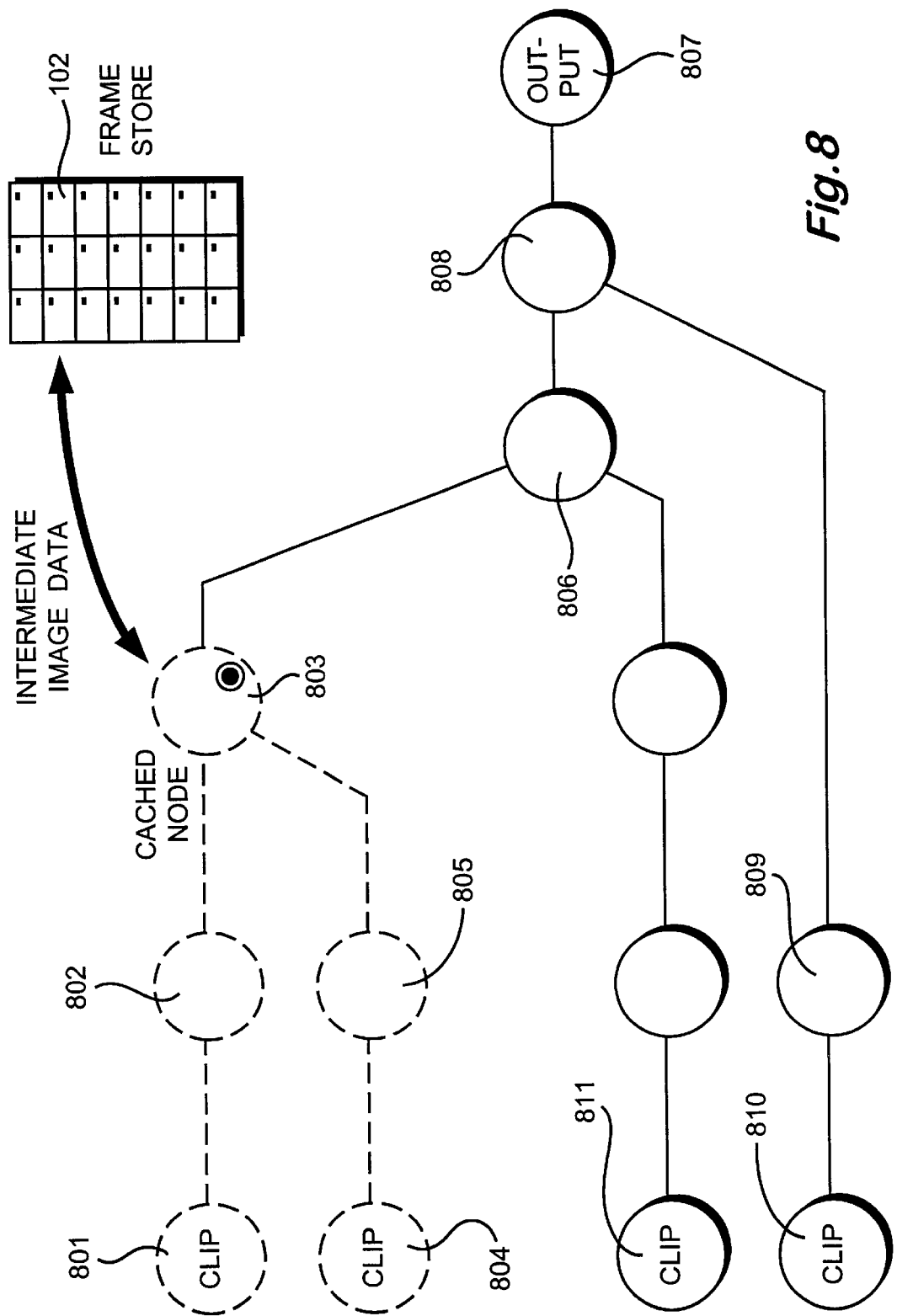
FIG. 8 details an improved data structure for controlling image processing in accordance with the present invention.

The invention is summarised in FIG. 8. Input node 801 supplies image data to process node 802, and process node 802 generates image data supplied to a first input of another process node 803. Clip node 804 similarly provides image data which is supplied to a third process node 805, and which supplies the second input of process node 803. The user has, for the time being, completed adjustments to all of nodes 801, 802, 803, 804 and 805, and so, as other parts of the process tree are adjusted, any processing performed by the central processing units 201 and 202 in respect of nodes 801 to 803 is superfluous. It is therefore preferable for the data generated in the output buffer of node 803 to be cached.

In a typical example, the user will arrange to repeatedly render frames one to twenty in a loop, and make adjustments to the processing tree while these frames are being calculated and previewed in the output window. The first time these frames are generated at the output node 807, all process nodes in the process tree will have to be computed. This will usually take a significant amount of time. However, because a preference for node 803 to be cached has been identified, during an initial cache write phase, intermediate image data generated in the output buffer of node 803 will be copied to the frame store 102, as well as being supplied to the next node 806 in the tree. Subsequent playbacks of any of frames one to twenty will result in intermediate image data for node 803 being retrieved from the frame store, and the calculations for nodes 801, 802, 803, 804 and 805 need not be performed.

The user decides which nodes are to be cached, and by selectively caching nodes in the process tree, output frames are calculated more quickly. As more and more processes become finally configured, nodes identified for caching remove more and more of the processing required to implement the entire process tree. In practice, because the tree is built up over time, significant new processes need only be added once a previous part of the process tree has been substantially finalised, and its output node identified for caching. Subsequent fine tuning of cached nodes or nodes leading to cached nodes, will result in one or several caches being flushed. However, most of the time, the user sees a considerable increase in the rate at which output images are rendered. Thus, interactivity with the parts of the processing tree where changes are being made is significantly improved. The results of experimentation are seen more quickly. From the point of view of the user, results are achieved in less time; there is an improvement in workflow.

Figure 9:
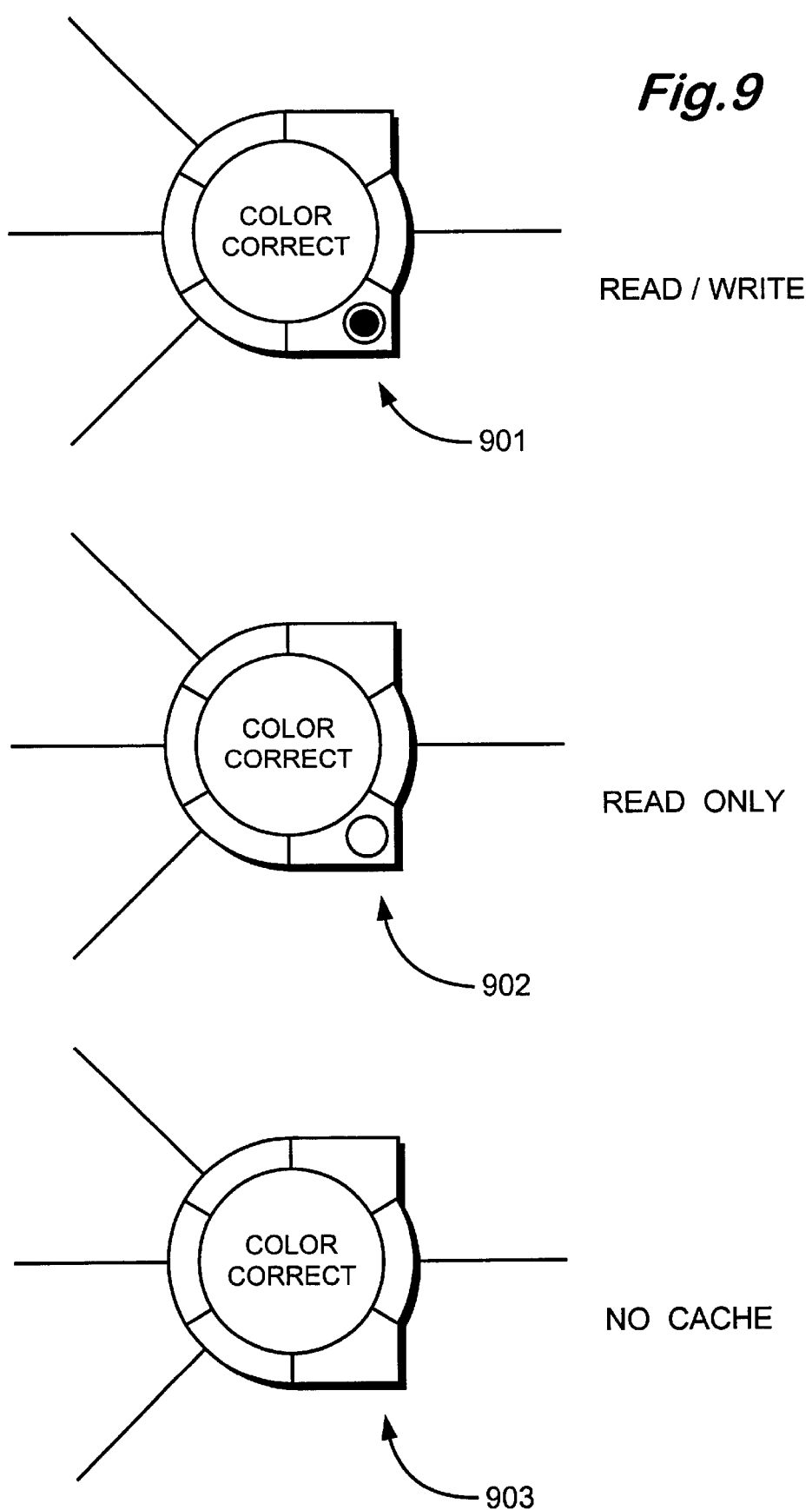
FIG. 9 details components of the user interface shown in FIG. 7 that facilitate the present invention.

When a user zooms in on a part of the process tree 700 shown in FIG. 7, the appearance of a process node is similar to the example shown in FIG. 9. FIG. 9 shows three instances of a color correction processing node, as it would be displayed on the monitor 104. The color correct node has several inputs. On the bottom right hand corner of the node is a region which contains an indication of the cache status for that node. A user modifies the cache status by positioning the cursor over the bottom right region of the node using the stylus of the graphics tablet 105. The stylus has a button on it, and clicking the button will modify the cache status for the node. There are three possible settings for the node cache, and these are indicated at 901, 902 and 903. Repeated clicking on the node at this position results in cycling through these three different possible settings.

At 901 the node cache has been set for both reading and writing. For each frame in the clip, the node has a tag indicating whether data for that frame is available in the cache. If data is not available for a particular frame when that frame is required, then it will have to be recalculated. After recalculation, the contents of the output buffer are supplied both to the frame store 102 and to the next node in the process tree 700. Subsequent viewing of this frame will result in the frame being fetched from the frame store 102 and the calculations for that frame are not performed. Whenever changes are made to nodes that affect the frame stored in the cache, the frame's data is recalculated and stored in the cache when that frame is next requested. This may eventually result in a lot of the frame store's capacity being used up. The user may monitor the number of frames cached by a node, and the remaining capacity of the frame store. As a result, the user may decide to invoke read only cache status, as illustrated at 902. This prevents new frames being added to the cache, and if cached frames are invalidated by changes to the processing tree, then these are not updated in the cache when they are recalculated. As a third option, a node may be set to have no cache, and this is illustrated at 903.

Figure 10:
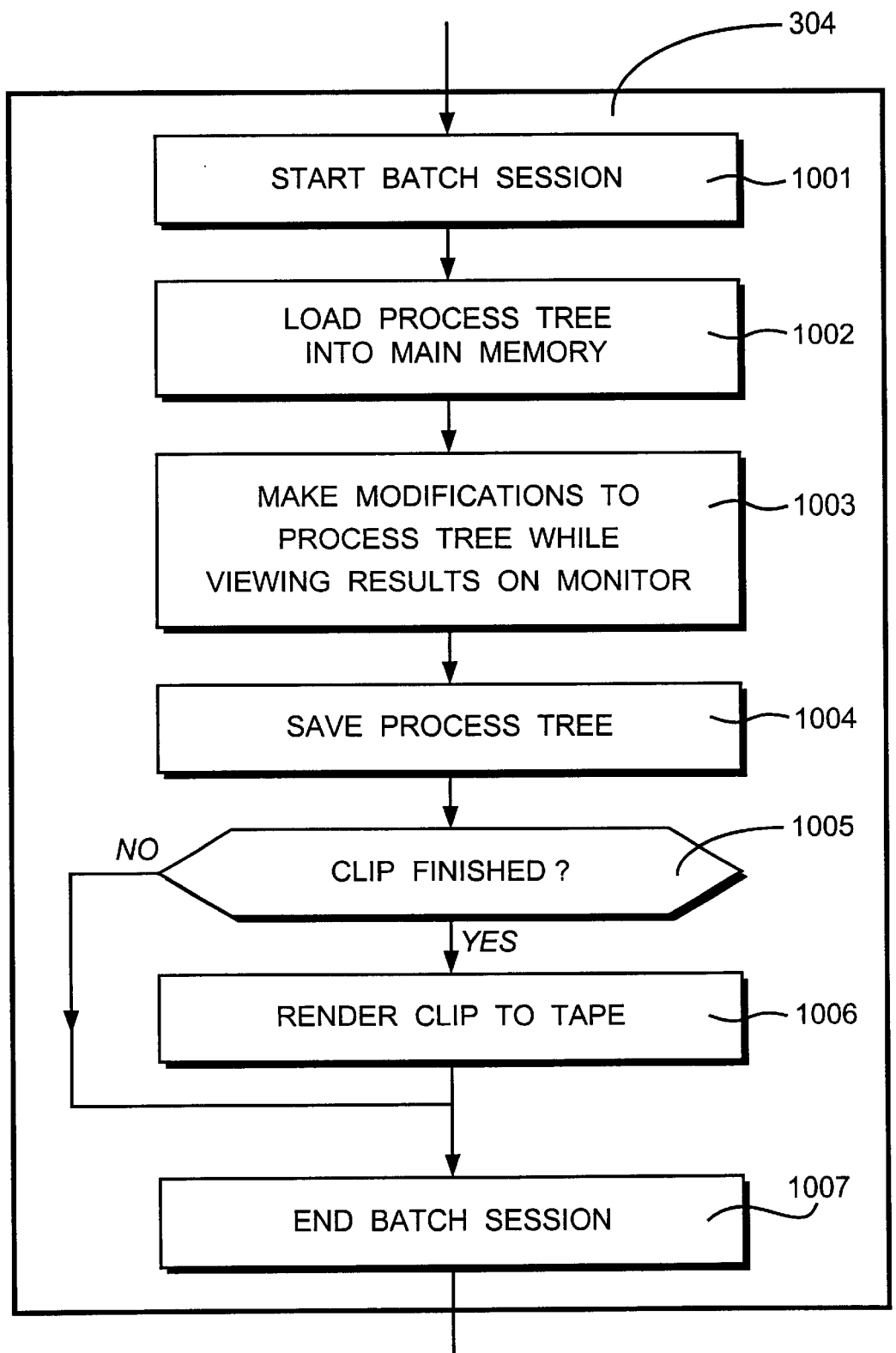
FIG. 10 details the step of image processing shown in FIG. 3, including a step of making modifications and viewing results.

Batch processing 304 shown in FIG. 3 is summarised in the flowchart shown in FIG. 10. At step 1001 Batch is started. At step 1002, button 716 is pressed and the user goes through a dialogue to select and load a process tree 404 into main memory 207. As an alternative, the user can create a process tree from scratch, by repeatedly using the add node button 713, in which case step 1002 is replaced by loading an empty process tree. At step 1003 modifications are made to the process tree while viewing the results of the modifications on the monitor 104. At step 1004 the process tree is saved. The process tree includes all node and connection layout data, along with internal configuration data for each node in the process tree. At step 1005 a question is asked as to whether the output clip is a finished clip. If so, control is directed to step 1006 and the finished clip is rendered to tape, for possible eventual transfer to film. After rendering, or if the process tree 700 is still at an intermediate stage of configuration, control is directed to step 1007, where the Batch session is ended.

Step 1003 shown in FIG. 10 comprises a plurality of processes running substantially in parallel on the central processing units 201 and 202. Process 1101 includes user interface instructions to enable a user to modify a node's internal configuration. Process 1102 includes instructions to enable a user to modify connections to or from a node. Process 1101 and process 1102 both have the potential to affect image data that is being created at various parts of the process tree 700. Thus, after their execution, control proceeds to process 1103, where any affected node caches are flushed. For example, with reference to FIG. 8, if process 802 is modified any contents of the cache for node 803 will be invalidated. As a result, in process 1103, node 803's cache will be flushed. In contrast, the process 1104 of adjusting the position of a node 706 on the monitor's display area has no effect on the image data being rendered, and so there is no need to perform node cache flushing after node positioning.

In order to see the results of the process tree 700 in the view window 707, it is necessary to render the parts of the process tree that are not already stored as image data in a node cache. The need to render may be triggered by several different conditions. At 1111 a user requests a single frame to be rendered, by appropriate manipulation of the transport controls 711 via the graphics tablet 105. At 1112 an automatic request for a frame is generated. This will be due to a sequence of frames being rendered, each one immediately after the other. Even when only a single frame is being viewed, a change somewhere in the process tree must usually be reflected in a change to the preview image 707. This condition is indicated at 1113. After any of conditions 1111, 1112 or 1113 have been satisfied, control is directed to step 1114, where rendering is performed.

Figure 11:
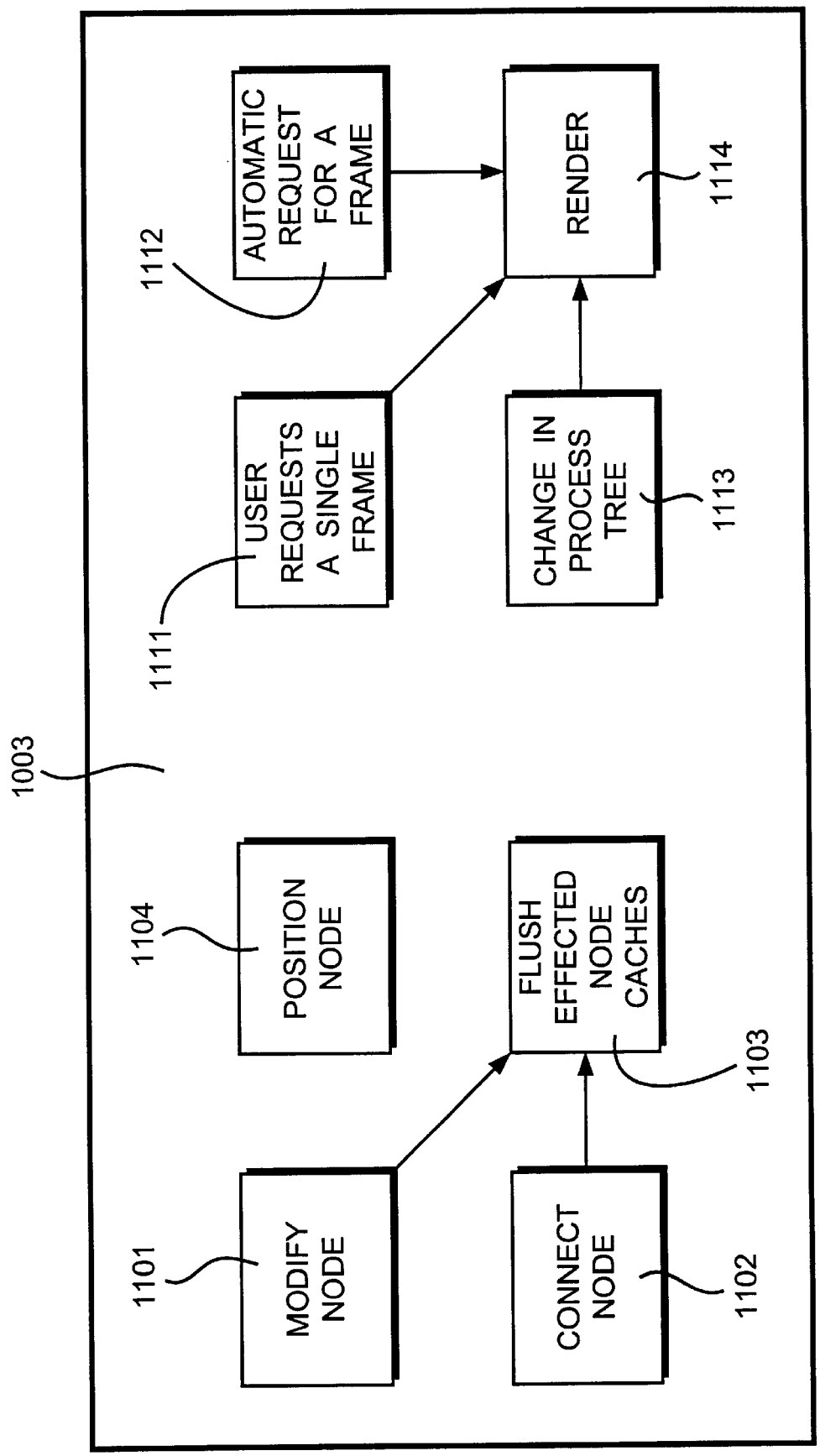
FIG. 11 details the step of making modifications and viewing results shown in FIG. 10, including a step of rendering an output frame in response to the data structure shown in FIG. 8.
Figure 12:
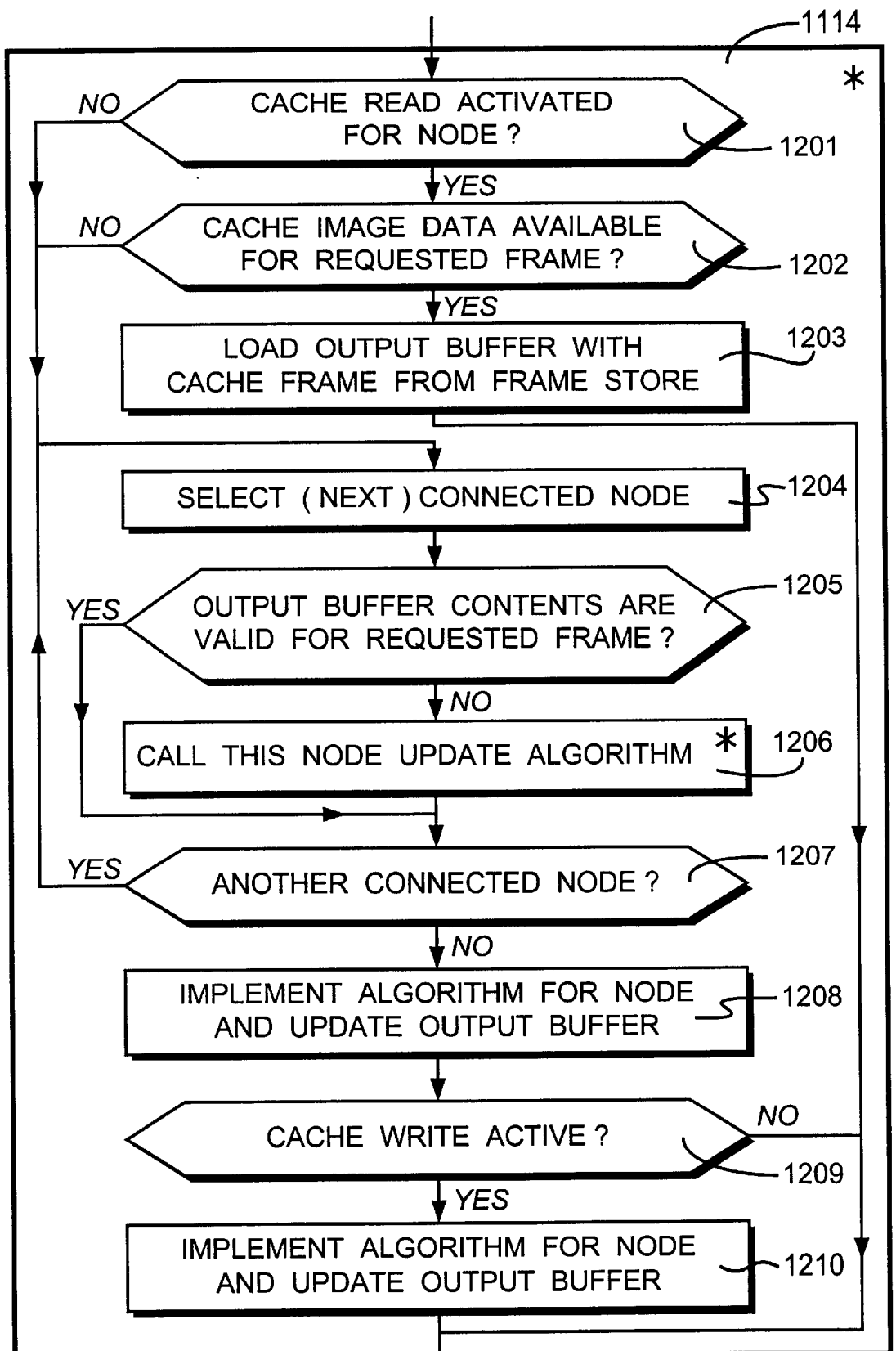
FIG. 12 details the rendering step shown in FIG. 11, including a step of implementing a cache strategy.

The rendering process 1114 shown in FIG. 11 is detailed in FIG. 12. The flowchart shown in FIG. 12 is recursive. Several of the steps in FIG. 12 are dependent upon the context in which they are executed. The render process 1114 starts by selecting the output node, and then recursively descending through the process tree to validate output buffers and eventually obtain a valid output buffer in the output node. The render process will be described with reference to the process tree shown in FIG. 8.

At step 1201 a question is asked as to whether the cache is activated for the present node. Initially, the present node is the output node 807, and this has no cache. Therefore, control is directed, on this initial occasion, automatically to step 1204. At step 1204 the first connected node is selected, which in the example is node 808. At step 1205 a question is asked as to whether the output buffer contents of the connected node are valid for the requested frame. If not, control is directed to step 1206. Step 1206 is itself defined by the flowchart of FIG. 12, executed with respect to the node selected at step 1204. Completion of step 1206 results in the output buffer of the node selected at step 1204 becoming valid, and it then becomes possible to proceed to step 1207.

At step 1207 a question is asked as to whether there is another connected node. In the example shown in FIG. 8, with respect to node 808, node 809 is also connected, and so steps 1204 to 1206 are executed as appropriate for node 809. Thereafter, control is directed to step 1208. At step 1208, the algorithm for the node is implemented. This may be trivial or highly complex, ranging from operations such as removing portions of an image in accordance with an output from a color keyer, an actual color keyer algorithm, or a three-dimensional compositing algorithm, in which multiple two-dimensional image sources are projected into a simulated three-dimensional space. In the case of the output node 807, image data is simply copied to its destination. This is usually a preview window 707, but may also be the frame store 102 or the tape player 101, once a clip is finished.

Execution of the algorithm for the process node at step 1209 results in the output buffer for the node becoming valid. At step 1209 a question is asked as to whether the node has been activated for cache writing. This will be the case for a node as indicated at 901 in FIG. 9. If so, control is directed to step 1210. At step 1210, an attempt is made to write the contents of the output buffer to the frame store 102 as part of the cache for the node. However, given that there is limited space in the frame store 102, a cache strategy is implemented in order to ensure that an appropriate decision is made when cache resources are low.

When applied to a cached node, step 1201 may be answered in the affirmative. This will be the case for the node cache setting indicated at 901 and 902. Control is then directed to step 1202, where a question is asked as to whether the requested frame exists in the node's cache. If not, control is directed to step 1204 and proceeds as described above. Alternatively, if the frame has already been cached, it is loaded into the output buffer for the present node at step 1203. This completes the description for execution of the flowchart of FIG. 12 with respect to a particular node.

The behaviour of the flowchart shown in FIG. 12 may be considered by applying it first to a clip node, such as clip node 810, which obtains image data from the frame store 102. Then a process node, 809, which implements some kind of processing algorithm, and finally for the output node. But in fact, the recursive nature of the rendering process starts at the output node 807, and descends through the process tree until all intermediate image data has been either computed or obtained from the cache. At that point the image data is copied from the output buffer of the node just prior the output node, in this case node 808, and supplied to its destination, such as the graphics card 208.

Figure 13:
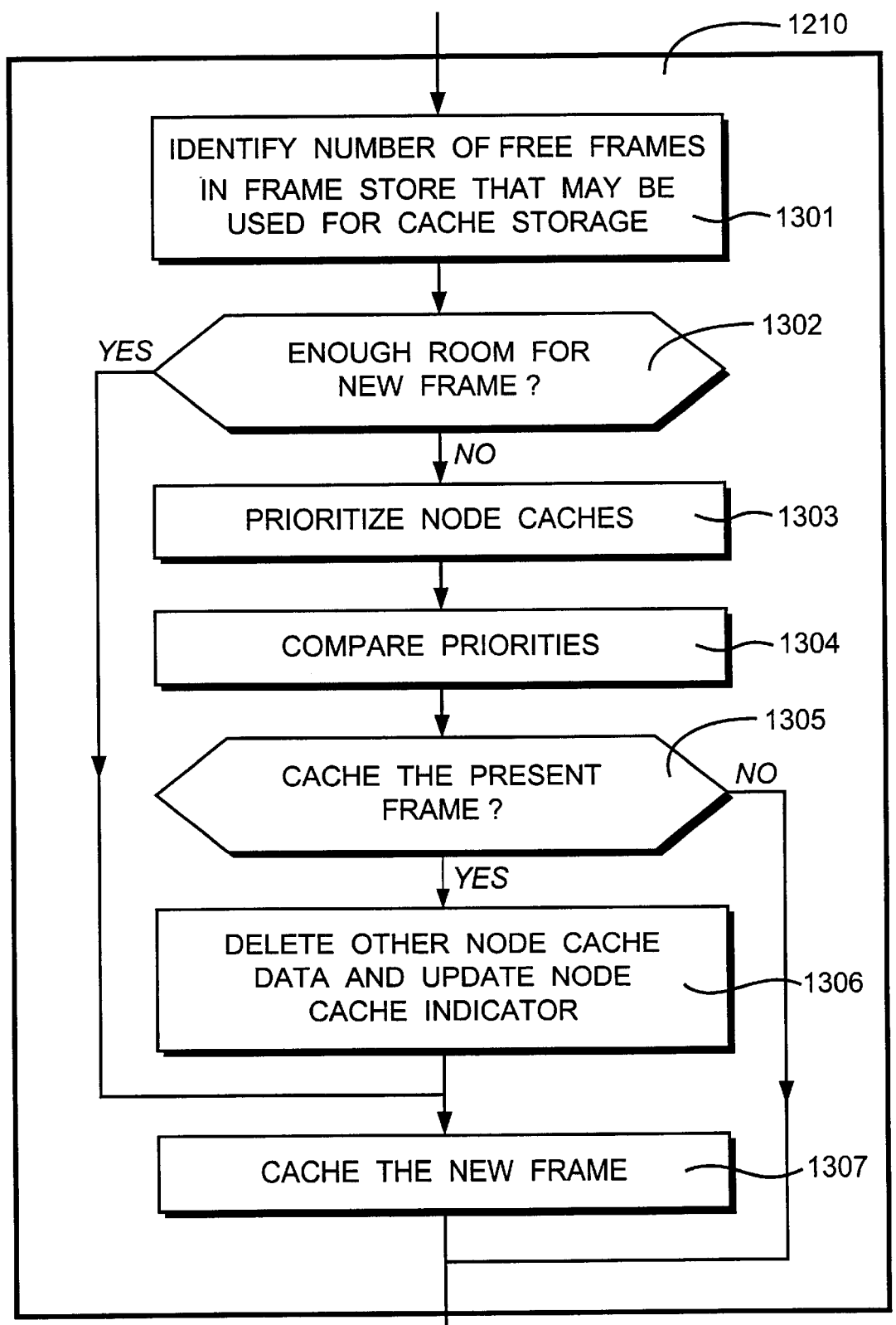
FIG. 13 details the step of implementing a cache strategy shown in FIG. 12, including a step of prioritising node caches.

The step 1210 of implementing a cache strategy and storing the output buffer in the frame store, shown in FIG. 12, is detailed in FIG. 13. At step 1301 an identification is made of the number of frames in the frame store 102 that may be used for cache storage. At step 1302 a question is asked as to whether there is enough room for the new frame. If so, control is directed to step 1307, and the frame is stored in the cache. If there is not enough room in the frame store 102, control is directed through steps 1303 to 1306. At step 1303 nodes that have caches are prioritised. At step 1304 priorities calculated at step 1303 are compared. At step 1305 a decision is made as to whether the present frame should be cached.

If the present node does not have the lowest priority of the priorities compared at step 1304, then control is directed to step 1306. Alternatively, the present frame is simply not cached. At step 1306 image data from another node's cache is deleted to make room for the present node's new frame. It may be preferable to delete several frames, as it is likely that this will result in a slight increase in efficiency when processing subsequent requests of a similar nature. The image data deleted will be from the node that had the lowest priority calculated at step 1303. Furthermore, as a result of this deletion, the cache indicator on the node whose cache is being at least partially deleted may have its indicator changed from read and write to read only, indicated at 901 and 902 respectively in FIG. 9. At step 1307, the new frame is written to the frame store.

Figure 14:
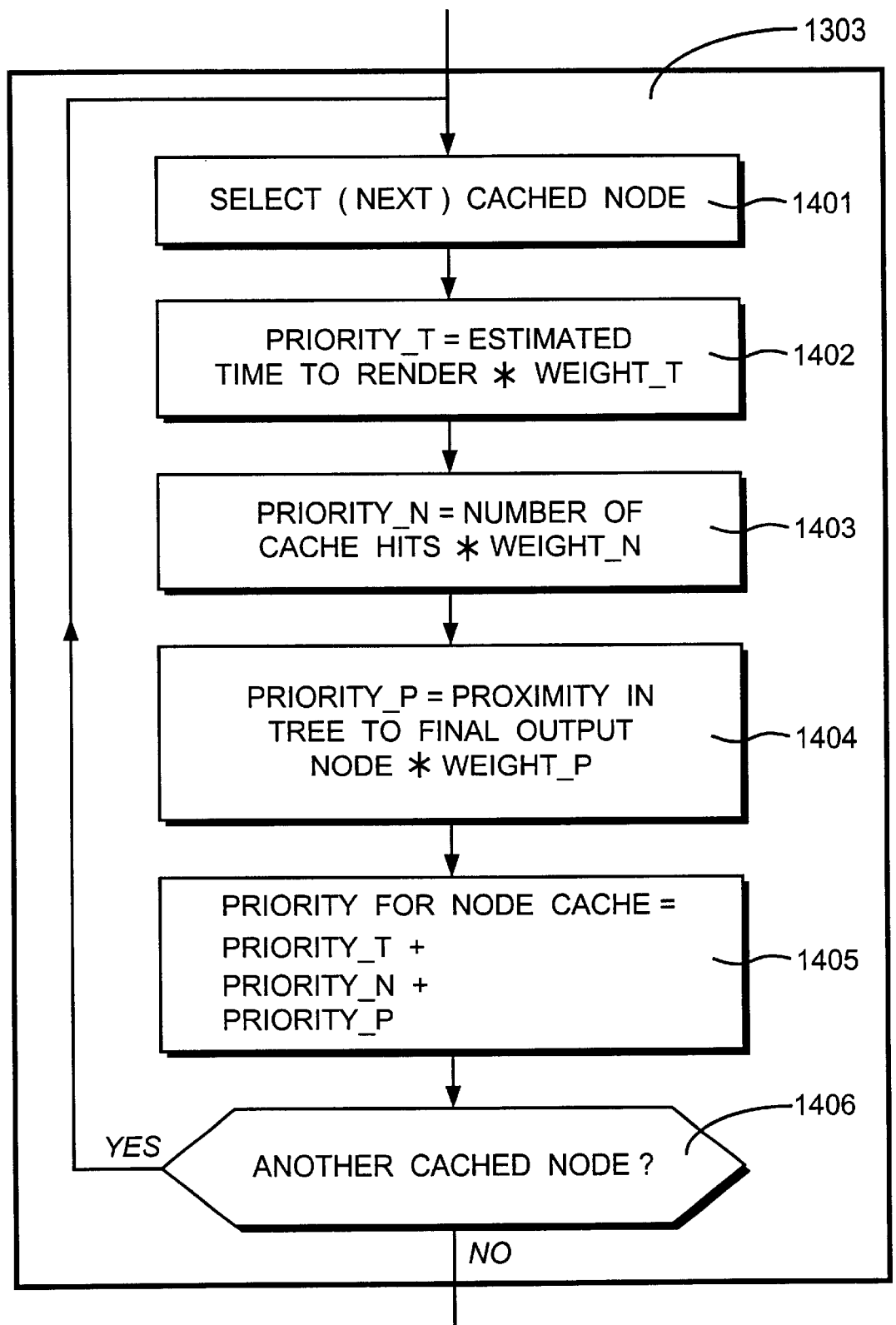
FIG. 14 details the step of prioritising node caches shown in FIG. 13.

The process 1303 of prioritising node caches is detailed in FIG. 14. At step 1401 the first cached node is selected. Steps 1402 to 1405 facilitate a measure of priority with respect to the cache of the node selected at step 1401. At step 1402 PRIORITY_T is given as the estimated time to render a single frame multiplied by a weighting constant WEIGHT_T. At step 1403 PRIORITY_N is a measure of the frequency of cache hits for the node, given by the number of cache hits occurring over a fixed number of previous frames. This is multiplied by a weighting constant WEIGHT_N. At step 1404 PRIORITY_P is given by a measure of the proximity to the output node multiplied by a weighting constant WEIGHT_P. The proximity value can be the maximum number of nodes in any chain from input to output in the process tree, minus the number of nodes between the present node and the output node. At step 1405 PRIORITY_T, PRIORITY_N and PRIORITY_P are added together to form the overall priority for the node. At step 1406 a question is asked as to whether there are any other nodes with caches that remain to be prioritised. If so, control is directed back to step 1401. Alternatively, this completes the step of node prioritisation 1303.

FIG. 14 details a strategy in which cached image data is removed according to a measure of its value to the user. As an alternative, no strategy need be used. When there is no remaining space on the frame store 102 for additional cache data, then cache data is simply not written. The user will be made aware of this situation by monitoring the amount of cache storage available via the user interface shown in FIG. 7. The user can then determine which node cache can be switched off. This has the advantage that the user controls the cache strategy, and can thus implement a more appropriate strategy than is possible by simply measuring performance parameters over a period of time.

Figure 15:
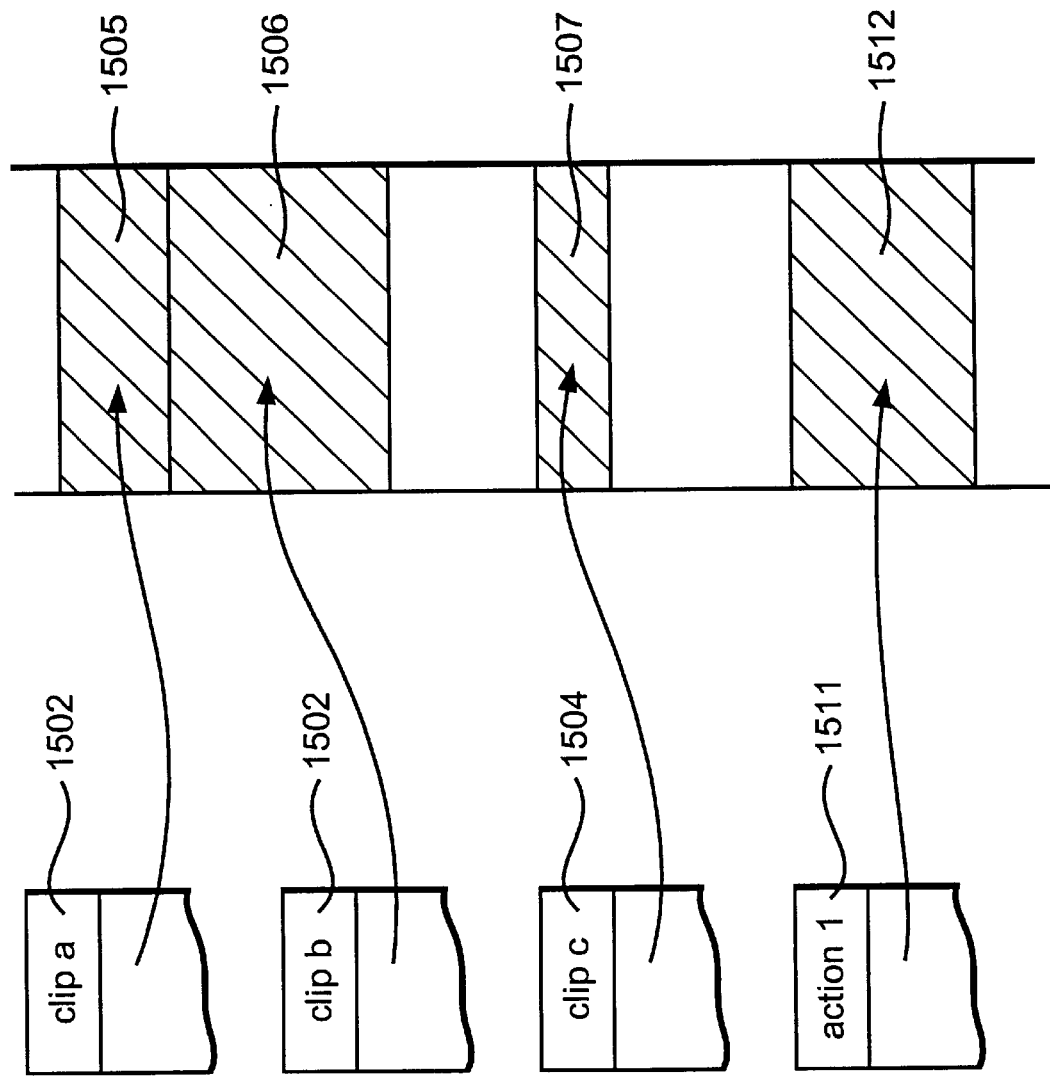
FIG. 15 details data structures on the hard disk drive shown in FIG. 2 used to communicate with the frame store shown in FIG. 1.
Figure 15:
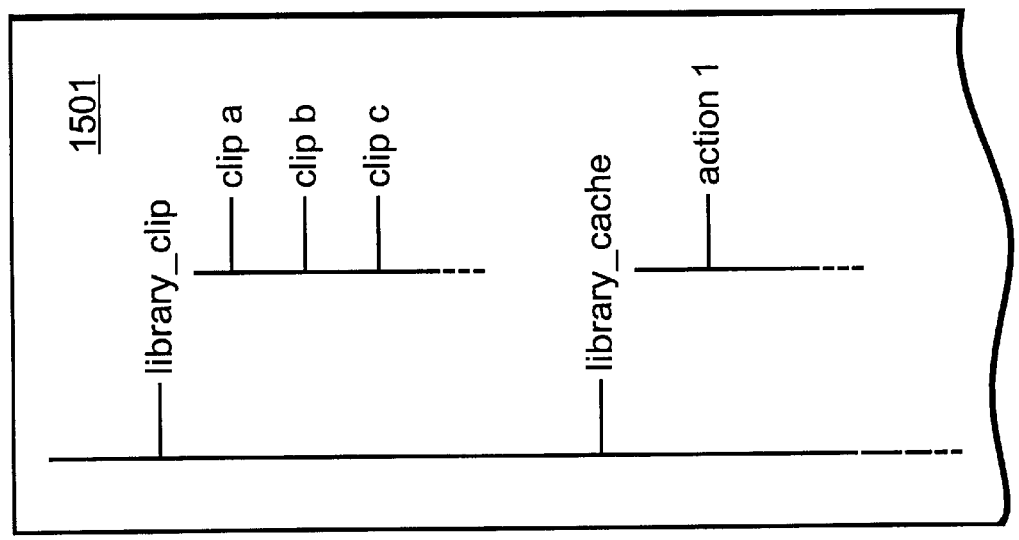

A node cache comprises two forms of data. Firstly there is the image data itself, that is stored in the frame store 102. However, the frame store contains only image data, and so the hard disk 212 contains data describing where images for a particular node cache are stored in the frame store 102. Data structures for cache storage are illustrated in FIG. 15.

A part of the directory structure of the hard disk 212 is shown at 1501. A library of data points to clip data structure files that are used by clip nodes 801, 804, 810 and 811 to retrieve clip image data from the frame store 102. Each clip has an associated file, and examples are illustrated of files called clipa 1502, clipb 1503 and clipc 1504. Each file contains the information required by a clip node to obtain image data 1505, 1506 or 1507 from the frame store 102.

A similar library of data points to node cache files. A single example is shown for a node called action1. The node cache file 1511 for action1 is given the same name as its node, and this file is formatted in the same way as a clip file. It points to image data 1512 in the frame store. By looking at the contents of the action1 file 1511, it is possible to determine the location of each frame of image data for that node cache. Furthermore, as node data is not necessarily cached in sequence, the cached image data 1512 may include data for frames one, seven to thirteen, twenty and twenty-seven. A clip will, by contrast, usually contain a full sequence of image frames. It is possible for the user to preview cached frames in the same way as a clip. Under these circumstances, an attempt to display a missing intermediate frame will simply result in the display of a blank field.

What we claim is:

1. A method of processing image data in an image processing system comprising:
    (a) storing instructions and a data structure representing processing to be performed on source image data in image storage means,
    (b) defining a sequence of operations to be performed in order to process said source image data in accordance with said data structure, wherein;
        (i) said data structure includes a plurality of image processing nodes;
        (ii) processing nodes are connected to each other to define a processing pipeline for image data;
    (c) displaying a graphical user interface to facilitate user interaction with said data structure, wherein said graphical user interface comprises:
        (i) a graphical representation of an intermediate process node of said data structure;
        (ii) a graphical representation of a node cache preference for the intermediate process node;
    (d) updating said data structure in response to a user manipulation of said graphical representation of the node cache preference;
    (e) processing image data in response to said data structure;
    (f) storing, in a cache, image data associated with the immediate process node in response to the node cache preference; and
    (g) subsequently processing image data in response to parts of said data structure not cached by said intermediate node.

2. A method according to claim 1, wherein said node cache preference is determined with reference to a user preference for a node cache.

3. A method according to claim 1, wherein said node cache preference is determined with reference to the remaining data storage capacity of said image data storage means.

4. A method according to claim 1, wherein said node cache preference is a read only preference.

5. A method according to claim 1, wherein said node cache preference is a read write preference.

6. A method according to claim 1, wherein a comparison is made between parameters for a plurality of read or read write cached nodes in order to identify a node cache preference for an individual node.

7. A method according to claim 6, wherein said parameters include a measure of cache effectiveness for respective nodes.

8. A method according to claim 7, wherein said parameters are weighted in order to determine a cache priority.

9. Apparatus for processing image data, comprising:
(a) image data storage means;
(b) memory means for storing instructions and a data structure representing processing to be performed on source image data in said image storage means, wherein:
   (i) said data structure includes a plurality of image processing nodes;
   (ii) said plurality of image processing nodes are connected to each other to define a processing pipeline for image data;
(c) processing means for performing said image processing; and
(d) said instructions define a sequence of operations to be performed in order to process said source image data in accordance with said data structure, wherein said instructions comprise;
   (i) processing image data in response to said data structure;
   (ii) storing in cache image data associated with an intermediate node of said data structure in response to an identification of a node cache preference for said intermediate node; and
   (iii) processing image data in response to parts of said data structure not affecting image data that has been cached by said intermediate node;
(e) display means configured to display a graphical interface to facilitate user interaction with said data structure, wherein;
   (i) said graphical user interface comprises a graphical representation of said intermediate no&of node data structure;
   (ii) said graphical user interface comprises a graphical representation of the node cache preference for the intermediate node; and
   (iii) said data structure is updated in response to a user manipulation of said graphical representation of the node cache preference.

10. Apparatus according to claim 9, wherein said node cache preference has been determined with reference to a user preference for a node cache.

11. Apparatus according to claim 9, wherein said node cache preference has been determined with reference to the remaining data storage capacity of said image data storage means.

12. Apparatus according to claim 9, wherein said node cache preference is a read only preference.

13. Apparatus according to claim 9, wherein said node cache preference is a read write preference.

14. Apparatus according in claim 9, wherein a comparison has been made between parameters for a plurality of read or read write cached nodes in order to identify a node cache preference for an individual node.

15. Apparatus according to claim 14, wherein said parameters include a measure of cache effectiveness for respective nodes.

16. Apparatus according to claim 15, wherein said parameters are weighted in order to determine a cache priority.

17. A computer-readable medium having computer-readable instructions executable by a computer configured as part of an image processing system that includes display means and image storage means, said computer comprising memory means for storing said instructions and a data structure representing processing to be performed on source image data in said image storage means, processing means for performing said image processing, where said instructions define a sequence of operations to be performed to process said source image data in accordance with said data structure, wherein:
said data structure includes a plurality of image processing nodes,
processing nodes are connected to each other to define a processing pipeline for image data,
and said instructions are executable by said processing means to perform the steps of:
processing image data in response to said data structure,
displaying a graphical user interface to facilitate user interaction with said data structure, wherein said graphical user interface comprises a graphical representation of an intermediate node of said data structure and a graphical representation of a node cache preference for the intermediate node;
updating said data structure in response to a user manipulation of said graphical representation of the node cache preference;
storing image data associated with the intermediate node in said data structure in response to an identification of the node cache preference, and
subsequently processing image data in response to parts of said data structure nor cached by said intermediate node.

18. A computer-readable medium according to claim 17, having instructions such that said node cache preference is determined with reference to a user preference for a node cache.

19. A computer-readable medium according to claim 17, having instructions such that said node cache preference is determined with reference to the remaining data storage capacity of said image data storage means.

20. A computer-readable medium according to claim 17, including instructions for configuring said node cache preference to be a read only preference.

21. A computer-readable medium according to claim 17, including instructions for configuring said node cache preference to be a read write preference.

22. A computer-readable medium according to claim 17, including instructions for performing a comparison between parameters for a plurality of read or read write cached nodes, and thereupon identifying a node cache preference for an individual node.

23. A computer-readable medium according to claim 22, including instructions for performing said comparison wherein said parameters include a measure of cache effectiveness for nodes.

24. A computer-readable medium according to claim 23, including instructions such that said parameters are weighted in order to identify a cache priority.

* * * * *

UNITED STATES PATENT AND TRADEMARK OFFICE
CERTIFICATE OF CORRECTION

PATENT NO. : 6,867,782 B2
DATED : March 15, 2005
INVENTOR(S) : Michel Gaudette et al.

It is certified that error appears in the above-identified patent and that said Letters Patent is hereby corrected as shown below:

Column 13,
Line 21, "storing in cache image" should read -- storing, in a cache, image --.
Line 28, "graphical interface" should read -- graphical user interface --.
Line 32, "no&of node" should read -- node of said --.

Column 14,
Line 32, "nor" should read -- not --.

Signed and Sealed this

Twenty-first Day of February, 2006

JON W. DUDAS
*Director of the United States Patent and Trademark Office*